US008943510B2

(12) United States Patent
Oshman et al.

(10) Patent No.: US 8,943,510 B2
(45) Date of Patent: Jan. 27, 2015

(54) MUTUAL-EXCLUSION ALGORITHMS RESILIENT TO TRANSIENT MEMORY FAULTS

(75) Inventors: Rotem Oshman, Cambridge, MA (US); John R. Douceur, Bellevue, WA (US); Thomas Moscibroda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 12/971,983

(22) Filed: Dec. 17, 2010

(65) Prior Publication Data

US 2012/0159504 A1   Jun. 21, 2012

(51) Int. Cl.
G06F 9/46 (2006.01)
G06F 9/52 (2006.01)
G06F 11/14 (2006.01)

(52) U.S. Cl.
CPC ............ *G06F 9/526* (2013.01); *G06F 11/1479* (2013.01); *G06F 2201/825* (2013.01)
USPC .......................................... 718/104; 718/100

(58) Field of Classification Search
CPC  G06F 9/526; G06F 11/1479; G06F 2201/825
USPC .................................. 718/100, 104; 710/200
See application file for complete search history.

(56) References Cited

U.S. PATENT DOCUMENTS 3,675,200 A * 7/1972 Bossen et al. ................. 714/758
5,968,185 A * 10/1999 Bressoud et al. ............... 714/10
7,155,524 B1   12/2006 Reiter et al.
7,493,618 B2 * 2/2009 Michael et al. ............... 718/102
8,209,448 B2 * 6/2012 Sato et al. ........................ 710/37
2003/0061394 A1 * 3/2003 Buch .............................. 709/310
2004/0019771 A1 * 1/2004 Quach ........................... 712/229
2006/0143361 A1 * 6/2006 Kottapalli et al. ............. 711/100
2006/0253856 A1 * 11/2006 Hu et al. ........................ 718/104
2007/0067774 A1 * 3/2007 Kukanov et al. .............. 718/102
2008/0114923 A1 * 5/2008 In et al. ......................... 711/103
2010/0169744 A1 * 7/2010 Krause .......................... 714/773

OTHER PUBLICATIONS

Ray et al. "Dual use of superscalar datapath for transient-fault detection and recovery", Proceedings of the 34th annual ACM/IEEE international symposium on Microarchitecture. 2001, pp. 214-224.*
Anderson, "Lamport on Mutual Exclusion: 27 Years of Planting Seeds", <<http://www.cs.unc.edu/~anderson/papers/lamport.pdf>>, 2001, 10 pages.

(Continued)

*Primary Examiner* — Emerson Puente
*Assistant Examiner* — Willy W Huaracha
(74) *Attorney, Agent, or Firm* — Stephen A. Wight; Judy Yee; Micky Minhas

(57) ABSTRACT

Techniques for implementing mutual-exclusion algorithms that are also fault-resistant are described herein. For instance, this document describes systems that implement fault-resistant, mutual-exclusion algorithms that at least prevent simultaneous access of a shared resource by multiple threads when (i) one of the multiple threads is in its critical section, and (ii) the other thread(s) are waiting in a loop to enter their respective critical sections. In some instances, these algorithms are fault-tolerant to prevent simultaneous access of the shared resource regardless of a state of the multiple threads executing on the system. In some instances, these algorithms may resist (e.g., tolerate entirely) transient memory faults (or "soft errors").

20 Claims, 4 Drawing Sheets

(56) References Cited

OTHER PUBLICATIONS

Gilbert, et al., "RAMBO: A Robust, Reconfigurable Atomic Memory Service for Dynamic Networks", <<http://groups.csail.mit.edu/tds/papers/Gilbert/rambo-journal3.pdf>>, 2008, 52 pages.

Herman, "SuperStabilizing Mutual Exclusion", <<http://citeseerx.ist.psu.edu/viewdoc/download;jsessionid=B79AA3CE55F3DF68CD9CED0296A283DD?doi=10.1.1.47.8376&rep=rep1&type=pdf>>, Jun. 27, 1997, 45 pages.

Papatriantafilou, et al., "Wait-Free Handshaking using Rainbow Coloring", <<http://citeseerx.ist.psu.edu/viewdoc/download?doi=10.1.1.23.9506&rep=rep1&type=pdf>>, 2000, 9 pages.

Wnat, et al., "Compiler-Managed Software-based Redundant Multi-Threading for Transient Fault Detection", <<http://ieeexplorejeee.org/stamp/stamp.jsp?tp=&arnumber=4145119>>, Mar. 11, 2007, 13 pages.

\* cited by examiner

MUTUAL-EXCLUSION ALGORITHMS RESILIENT TO TRANSIENT MEMORY FAULTS

BACKGROUND

Concurrent programming techniques utilize mutual-exclusion algorithms to avoid the simultaneous use of a common resource, such as a global variable, by "critical sections" of multiple different threads executing at the same time. A critical section is a user-defined piece of code, which may in some instances define a portion of code a thread accesses a common resource, access to which should be atomic (i.e., at any time, only one thread should execute the critical section). However, simply defining a critical section is not itself a mechanism or algorithm for mutual exclusion. That is, a thread (or "program" or "process") can include a critical section without any mechanism or algorithm that implements mutual exclusion. As such, a developer may add code to the thread in accordance with a well-known mutual-exclusion algorithm to help ensure that no two threads execute their respective critical sections at the same time. The addition of this code avoids the situation where these threads simultaneously access a common resource, such as a shared variable or data structure. More generally, the addition of this code avoids the situation where the threads simultaneously execute their critical sections—without regard to whether or not critical sections of the threads access a common resource.

While there exist algorithms to enable mutual exclusion, these algorithms usually often not resilient against any failures that may occur within the computing device that executes the multiple threads. As such, these mutual-exclusion algorithms may be prone to failure in some scenarios.

SUMMARY

This document describes, in part, mutual-exclusion algorithms that are fault-resistant, as well as computing devices specifically configured to execute these fault-resistant, mutual-exclusion algorithms. For instance, this document describes systems that implement fault-resistant, mutual-exclusion algorithms that at least prevent simultaneous execution of critical sections of multiple threads when (i) one of the multiple threads is in its critical section, (ii) the other thread(s) are waiting in a loop to enter their respective critical sections, and (iii) there is no contention between the threads. In some instances, these algorithms are fault-tolerant to prevent simultaneous execution of the critical sections regardless of a state of the multiple threads executing on the system. In some instances, these algorithms may resist (e.g., tolerate entirely) transient memory faults (or "soft errors").

This summary is provided to introduce concepts relating to fault-resistant, mutual-exclusion algorithms. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
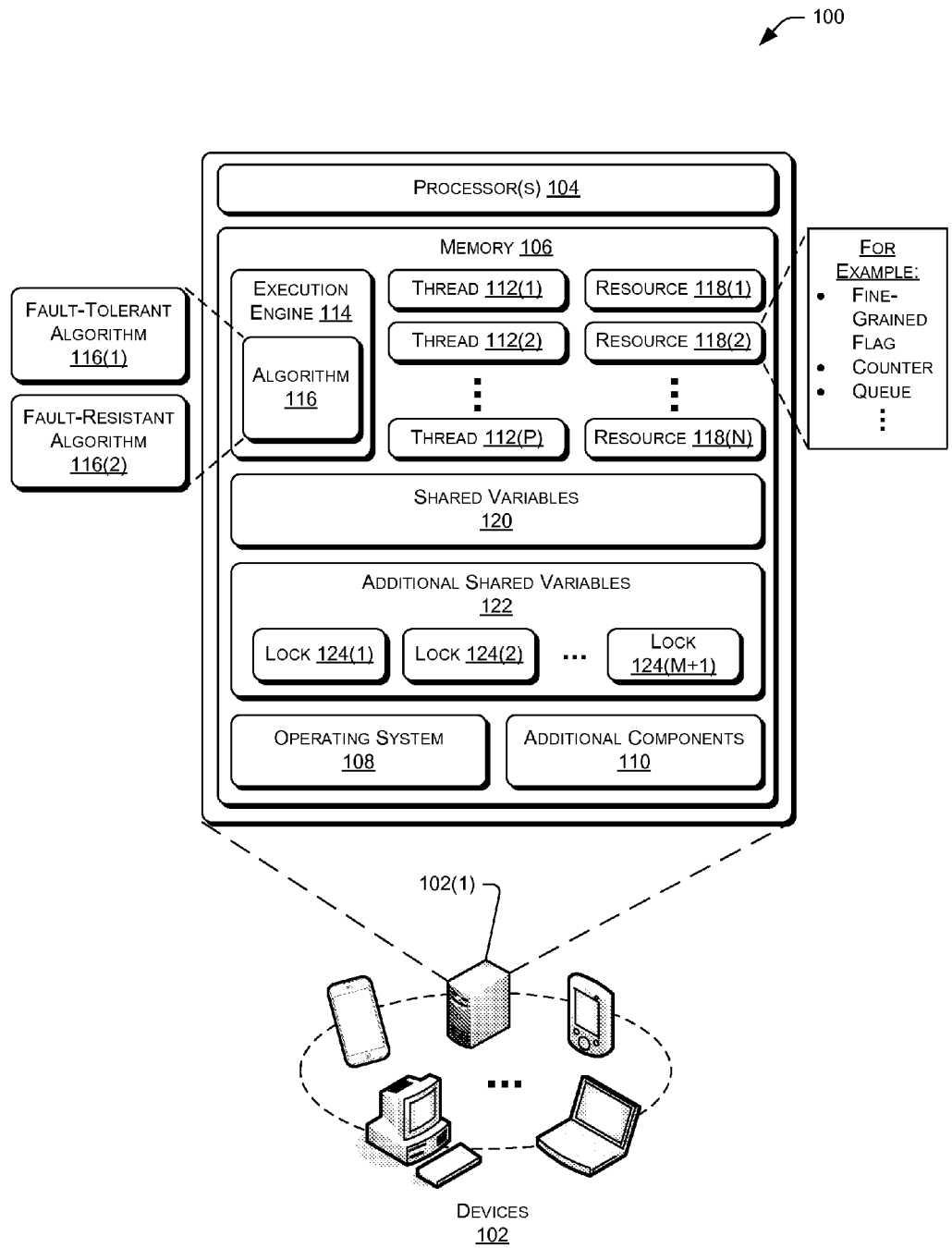
FIG. 1 illustrates an example computing architecture that may implement fault-resistant, mutual-exclusion algorithms.

The disclosure describes mutual-exclusion algorithms that are fault-resistant, as well as computing devices and memories specifically configured to execute these fault-resistant, mutual-exclusion algorithms. As described in detail below, a "fault" refers to the situation where a value of a shared variable is corrupted (in potentially arbitrary ways) because a computing device experiences a temporary hardware failure. Traditional mutual-exclusion algorithms typically do not resist or tolerate entirely these types of faults, causing the mutual-exclusion algorithms to fail. That is, these algorithms rely on the value of shared variable being a proper value in order to ensure that no threads execute their critical sections at the same time, and such arbitrary corruption of these values may therefore lead to a mutual-exclusion violation. These mutual-exclusion violations have been reported to lead to costly failures in high-end computing systems.

In this regard, this document describes, in part, systems that implement fault-resistant, mutual-exclusion algorithms that at least prevent simultaneous access of a shared resource by multiple threads in spite of one or more memory faults when (i) one of the multiple threads is in its critical section, and (ii) the other thread(s) are waiting in a loop to enter their respective critical sections. In some instances, the algorithms may prevent the simultaneous access when there is no contention between threads, while, in other instances, the algorithms achieve this without regard to whether or not the threads are in contention. In still other instances, these algorithms are fault-tolerant to prevent simultaneous access of the shared resource regardless of a state of the multiple threads executing on the system.

To resist faults in this manner, the techniques may include fortifying an existing mutual-exclusion algorithm to make this existing algorithm more fault-resistant, such as fault-tolerant in some instance. In some instances, the techniques may create additional shared variables for reference by the threads desiring to enter their respective critical sections. In other instances, meanwhile, the techniques may fortify an existing mutual-exclusion algorithm (i.e., make the algorithm more fault-resistant) without adding any variables not previously present in the existing algorithm. In either case, the existing algorithms may include Dekker's algorithm, Peterson's algorithm, or any other mutual-exclusion algorithm.

As discussed above, the techniques may create shared variables not previously present in a particular mutual-exclusion algorithm. For instance, in order to resist any number of "m" faults, the techniques may create m or m+1 shared variables (e.g., locks) for reference by the threads. When a particular thread completes the entry section defined by the algorithm, the algorithm may instruct the thread to determine whether each of these locks has been set. If at least one has been set (e.g., as indicated by having a value of "1"), then the algorithm may instruct the thread to again execute the entry section, since it appears that another thread may be executing its critical section and, hence, accessing the shared the resource. If, however, each of the locks has not been set (e.g., as indicated by having a value of "0"), then the algorithm may instruct the thread to set each of the locks and execute its critical section. Further, after this thread completes its critical section, the algorithm may instruct the thread to clear each of the locks (e.g., set the value of the locks to "0") before executing the exit section defined by the algorithm.

In some examples provided below, the fault-resistant, mutual-exclusion algorithms prevent or substantially prevent the simultaneous access to a shared resource by satisfying the m+1-hamming-distance property. In some instances, these algorithms satisfy this property by having a hamming distance of m+1 bits between v and v', wherein:

v represents the state of memory shared between the two threads when the threads are in their respective remainder sections; and v' represents the state of the memory shared between these threads when one of the threads is in its respective critical section and the other of the threads is in its respective remainder section.

To further prevent transient errors from affecting the mutual-exclusion properties of these algorithms, the algorithms may also instruct the threads to engage in a handshake that, when completed, enables one, but not both, of the threads to enter its respective critical section. In some instances, the algorithms may instruct the threads to enter into this handshake when one of the threads is in the entry section, while the other thread is in the entry section or in its critical section. Example implementations of this handshake are described in detail below.

The detailed discussion below begins with a section entitled "Mutual-Exclusion Algorithms and Transient Memory Faults," which provides context for the discussion that follows regarding the fault-resistant, mutual-exclusion algorithms. A section entitled "Example Computing Architecture" follows and describes one non-limiting environment that may implement the described fault-resistant, mutual-exclusion algorithms. A section entitled "Example Fault-Resistant, Mutual-Exclusion Algorithms" follows, before a brief conclusion ends the discussion. As shown below, the first three sections of this discussion include multiple sub-sections.

This brief introduction, including section titles and corresponding summaries, is provided for the reader's convenience and is not intended to limit the scope of the claims, nor the proceeding sections.

Mutual-Exclusion Algorithms and Transient Memory Faults
Mutual-Exclusion Algorithms As described above, concurrent programming techniques utilize mutual-exclusion algorithms to avoid the simultaneous use of a common resource, such as a global variable or a shared data structure, by "critical sections" of multiple different threads executing at the same time. The programmer may, in some instances, define a critical section as a piece of code in which a thread accesses a common resource. The intention is that the code marked as a critical section can be simultaneously accessed only by a single thread (i.e., it is executed atomically). However, a critical section is not itself a mechanism or algorithm for mutual exclusion. That is, a thread (or "program" or "process") can include a critical section without any mechanism or algorithm that implements mutual exclusion. As such, a developer may add code to the thread in accordance with a mutual-exclusion algorithm to help ensure that no two threads execute their respective critical sections at the same time. The addition of this code avoids the situation where these threads simultaneously access a common resource.

Examples of shared resources that these algorithms protect include fine-grained flags, counters, or queues, used to communicate between code that runs concurrently, such as an application and its interrupt handlers. The synchronization of access to those resources is an acute problem because a thread can be stopped or started at any time.

There are many software-based, mutual-exclusion algorithms, such as the Dekker Algorithm, the Peterson Algorithm, or Lamp ort's Bakery algorithm. Each of these algorithms ensures that no two threads simultaneously execute the critical section, and they also provide other desirable properties, including deadlock-freedom and fairness (i.e., absence of starvation).

Figure 2:
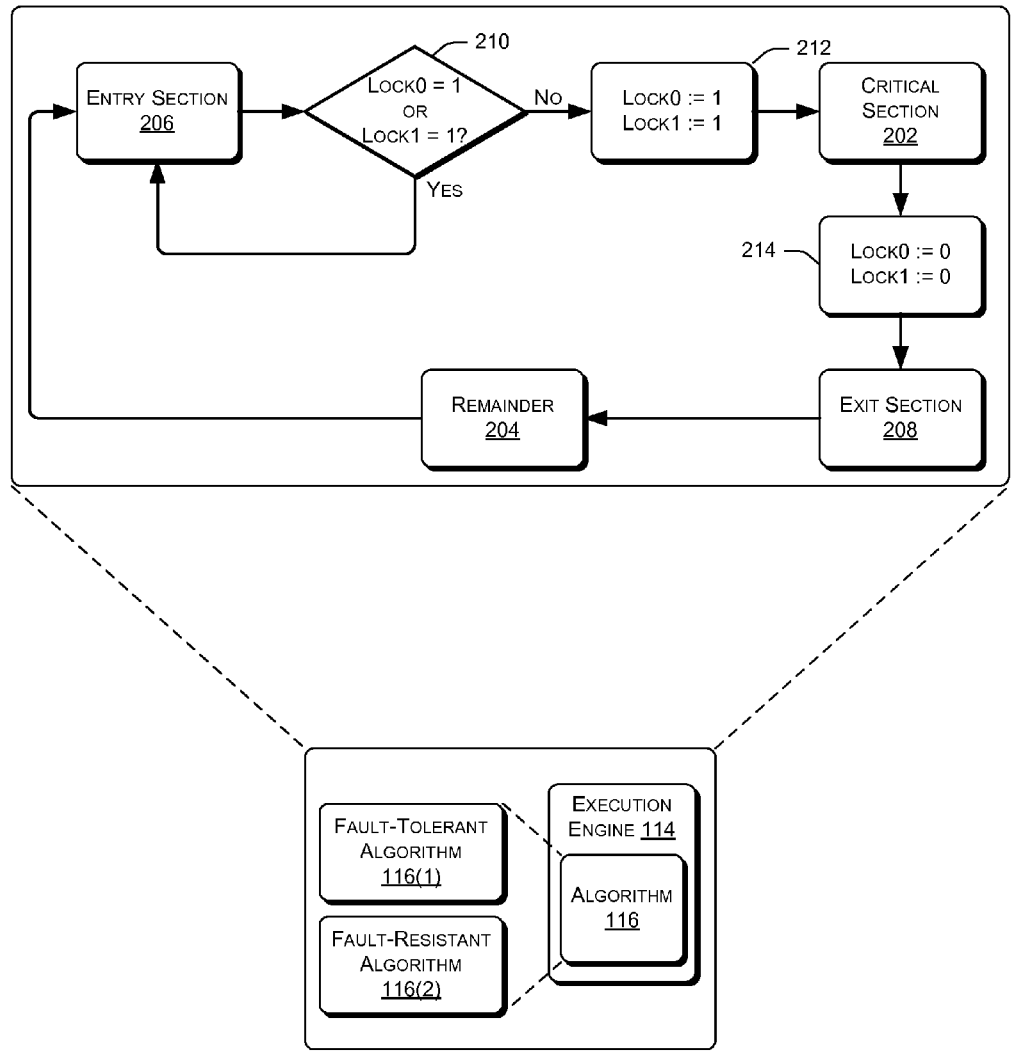
FIG. 2 illustrates an example structure of a fault-resistant, mutual-exclusion algorithm as applied to a particular thread. In some instances, sections of code within this example structure may be added to existing mutual-exclusion algorithms to fortify these existing algorithms—that is, to make these algorithms more resistant to faults.

As stated above, mutual-exclusion algorithms ensure that at any point in time, a single thread can be in its critical section. The algorithms define an entry section and an exit section, which comprise the code that each thread executes just before entering or leaving, respectively. Turning briefly to FIG. 2, for instance, a mutual-exclusion algorithm may provide the illustrated entry section 206 and the illustrated exit section 208. A "remainder" section (e.g., section 204 in FIG. 2), meanwhile, is code of a thread that is not related to either the mutual-exclusion algorithm or the critical section. A mutual-exclusion algorithm, therefore, defines the code in the entry section and in the exit section.

When discussing distributed and concurrent algorithms, two kinds of properties are of concern. A safety property is one which guarantees that a bad thing will not happen. The other kind is a progress property, which guarantees that a good thing will eventually happen. In the case of mutual exclusion, one safety property is that of mutual exclusion; that is, not more than one process or thread should have its program counter (PC) in the critical section at the same time.

There are two progress properties that may be desirable with mutual-exclusion algorithms. The first is deadlock freedom. This property can be phrased as, "if some process wants to enter the critical section, then some process will eventually enter the critical section." The other progress property, starvation avoidance, is stronger than the first and is phrased as, "if some process wants to enter the critical section, then that process will eventually enter the critical section." The latter property implies the former.

Transient Faults

A transient fault, or "soft error," is a temporary hardware failure that alters a signal transfer, a register value, or some other processor component. Transient faults can occur in different parts of the hardware stack in a computer system. For example, transient errors in the operation of a dynamic random access memory (DRAM) device can be caused by alpha particles emitted by traces of radioactive elements (such as thorium and uranium) present in the packaging materials of the device. These alpha particles manage to penetrate the die and generate a high density of holes and electrons in its substrate, which creates an imbalance in the device's electrical potential distribution that causes stored data to be corrupted. The corruption of stored information due to alpha particles is what is known as an alpha-induced "soft error." Soft errors are random and non-recurring, and the soft-error rate depends on circuit sensitivity and the alpha flux emitted by the package of the device. A single alpha particle that possesses enough energy can cause a soft error all by itself, although many other reasons for the occurrence of soft errors exist. While transient faults are temporary, they may corrupt computations.

Unfortunately, while soft errors can already cause substantial reliability problems, current trends in hardware design suggest that fault rates will increase in the future. More specifically, faster clock rates, increasing transistor density, decreasing voltages, and smaller feature sizes all contribute to increasing fault rates. Due to a combination of these factors, fault rates in modern processors have been increasing at a rate of approximately 8% per generation. These trends are well known in the architecture and compiler communities and, consequently, many solutions to the threat of soft errors have been proposed. At a high level, many of these solutions involve adding redundancy to computations in one way or another, but the specifics vary substantially.

For instance, some proposals involve hardware-only solutions such as error-correcting codes, watchdog co-processors, and redundant hardware threads, as well as software-only techniques that use both single and multiple cores. While hardware-only solutions may be efficient for a single, fixed-reliability policy, solutions that involve a specifically-configured computing device (based on software executing thereon) are flexible and costly in some instances. Some or each of the techniques described below involve computing devices and memories that are specifically-configured in this manner.

Impact of Transient Faults on Mutual-Exclusion Algorithms

Unfortunately, currently implemented mutual-exclusion algorithms typically do not provide fault-tolerance or resilience to transient faults or soft errors. Instead, these algorithms are typically optimized for performance metrics that assume correct hardware execution. The techniques described herein involve new mutual-exclusion algorithms that are resilient to transient faults, yet remain efficient in terms of performance as well as the amount of shared memory utilized by the algorithm. Some of the techniques described herein also allow "fortification" of existing mutual-exclusion algorithms to make them more resilient to soft errors.

Dekker and Peterson Mutual-Exclusion Algorithms

Existing mutual-exclusion algorithms are not fault-tolerant to soft errors and, hence, corruption of a shared variable used by these algorithms may result in violation of the mutual-exclusion property. Moreover, different existing algorithms have vastly different characteristics in terms of how likely it is that a mutual-exclusion violation will occur if a soft error occurs. That is, the resilience or susceptibility of existing mutual-exclusion algorithms can be vastly different. Some algorithms naturally have a "self-healing" tendency and, therefore, it may be rare for a soft error that affects a critical mutual-exclusion variable to cause a mutual-exclusion violation. Other algorithms, on the other hand, may be very susceptible, such that soft errors typically end up causing a violation of the mutual-exclusion property. For instance, it can be shown that Peterson's algorithm is particularly susceptible to soft errors, while Dekker's algorithm is less susceptible to these errors.

Fault-Resilience and Fault-Tolerance

The section immediately below provides several example mutual-exclusion algorithms that are fault-resistant and, in some instance, fault-tolerant. A mutual-exclusion algorithm is fault-tolerant if no one soft error can cause a mutual-exclusion violation, regardless of when exactly the soft error occurs. While fault-tolerance is the strongest form of resilience to soft errors, making algorithms fault-tolerant may come at a price of decreased efficiency and more complexity in some instances. Hence, some of the algorithms described below consider two weaker notions of resilience.

In these instances, it may be helpful to describe the notion of a "heavy state," which is a state in which threads may often reside. A "state" in a mutual-exclusion algorithm is any combination of program counters of the different threads. One example state is when one thread is in a third line (line 3) of its mutual-exclusion algorithm code, while the other thread is in a seventh line (line 7) of its mutual-exclusion algorithm code. Some states are much more likely to occur than others. For example, if one thread is waiting in a wait-loop, while another thread is in the critical section, it may be very likely that the threads spend significant amount of time in this particular state (for as long as the thread remains in the critical section). As such, this may be considered a "heavy state". At any point in time, the system is more likely to be in a heavy state that in a non-heavy state.

On the other hand, there are other states in which threads may spend very little time. For example, in Dekker's algorithm, each thread i first sets its variable $c\_i$ to 1. This occurs in line 1 of this algorithm. The state in which both threads are in Line 1 at the same time is very rare to occur, because both threads move on immediately after executing this line. As such, this state rarely occurs and, thus, it is not considered to be a heavy state as used herein.

The degree of resilience of a mutual-exclusion algorithm described herein may be characterized by their susceptibility to soft-errors in heavy-states. A mutual-exclusion algorithm that is resilient to soft errors in heavy states (e.g., in all heavy states) renders a mutual-exclusion violation very unlikely (although theoretically possible). As already described, a mutual-exclusion algorithm that is resilient to soft errors in all states is considered fault-tolerant. Depending on the precise definition of a heavy state, we can distinguish different resilience properties.

In some instances, a mutual-exclusion algorithm may be deemed "strongly 0-susceptible." Here, a heavy state is defined as a state in which (1) one thread is in the critical section, and (2) the other thread is in a waiting-loop (i.e., there is contention between the threads). Again, if a mutual-exclusion algorithm is resilient to soft errors in every such heavy state, the algorithm may be deemed as strongly 0-susceptible.

In other instances, a mutual-exclusion algorithm may be deemed "weakly 0-susceptible." Here, assume a Markov model in which threads alternate between wanting to enter the critical section, and leaving the critical section. Assume further that the time to execute the entry-section code and the exit-section code are infinitely small (i.e., there is no contention between the threads). Here, a heavy state is defined as a state in which (1) one thread is in the critical section, and (2) the other thread is waiting for entry into the critical section, where there is no contention between the threads. That is, a heavy state is any state that has a non-zero steady-state probability in such a simplified Markov model, and one thread is in the critical section.

Based on the descriptions above, it is true that each heavy state in the weak-susceptibility definition is also a heavy state in the strong-susceptibility definition, but not vice versa. Hence, any algorithm that has the strong 0-susceptible property, also has the weak 0-susceptible property, but not vice versa. In addition, an algorithm that is fault-tolerant is naturally also strongly 0-susceptible and weakly 0-susceptible, but not vice versa.

Example Computing Architecture

FIG. 1 illustrates an example computing architecture 100 that may implement fault-resistant, mutual-exclusion algorithms. The architecture 100 includes one or more computing devices 102 that may be specifically configured to implement these algorithms. The computing devices 102 may include server computers, personal computers, laptop computers, thin clients, mobile telephones, portable music players or any other sort of suitable computing device.

An example computing device 102(1) includes one or more processors 104 and memory 106, which may store an operating system 108 and any other components 110 traditionally found on a computing device. Of course, these additional components 110 may vary depending upon the implementation of the computing device 102(1). In addition, the example computing device 102(1) may include hardware and firmware components, also as found in traditional devices.

The memory 106 may comprise computer-readable media. This computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

FIG. 1 further illustrates that the memory 106 may store or otherwise have access to one or more threads 112(1), 112(2), . . . , 112(P), as well as an execution engine 114. The engine 114 represents any software or firmware configured to cause execution of the threads 112(1)-(P) on the one or more processors 104. The threads 112(1)-(P) may be associated with any program or application executing on the computing device 102(1). As illustrated, the execution engine 114 may execute the threads 112(1)-(P) with use of an algorithm 116. The algorithm 116 comprises a fault-resistant (e.g. strongly or weakly 0-susceptible), mutual-exclusion algorithm 116(1) or, in some instances, a fault-tolerant, mutual-exclusion algorithm 116(2). As discussed above, each algorithm that is fault-tolerant is fault-resistant, but not vice versa. As used herein, the algorithm 116 is generally described as a fault-resistant algorithm, although it is to be appreciated that it may also be fault-tolerant in some instances.

The execution engine 114 may utilize the algorithm 116 to execute the threads 112(1)-(P) while ensuring that no two threads simultaneously access a common resource 118(1), 118(2), . . . 118(N). The resources 118(1)-(N) may comprise fine-grained flags, counters, queues, data structures, and/or other type of resources. Furthermore, because the algorithm 116 is fault-resistant, the execution engine 114 may prevent or substantially prevent simultaneous access to a common resource even in the event of "m" soft errors. "Substantially" preventing such access may represent presenting such access in a defined heavy state, or with reference to a number (e.g., preventing such access in 70% of the time that m soft errors occur, 90%, 99%, etc.).

FIG. 1 further illustrates that the fault-resistant, mutual-exclusion algorithm 116 may utilize one or more shared variables 120 for the purpose of providing mutual exclusion. In some instances, these shared variables 120 represent those shared variables that a traditional mutual-exclusion algorithm utilizes before being fortified in one of the manners described below. In addition, the memory 106 may store one or more additional shared variables 122 that the algorithm 116 utilizes to provide the fault-resistance properties. These shared variables may include one or more locks 124(1), 124(2), . . . , 124(m+1). In some instances, the memory stores m or m+1 locks such that the algorithm 116 is fault-tolerant for m faults.

Example Fault-Resistant, Mutual-Exclusion Algorithms

Having described an example computing device 102(1) configured to implement a fault-resistant, mutual-exclusion algorithms, this section describes various techniques and algorithms to achieve resilient (0-susceptible and fault-tolerant) mutual-exclusion algorithms.

Fortifying Existing Mutual-Exclusion Algorithms

Consider a mutual-exclusion algorithm, which is given in the form of code for the entry and exit sections for each thread, as described above. Here, an n-process mutual-exclusion algorithm may be made strongly 0-susceptible (i.e., resilient to corruption of any single shared register) by adding two shared read/write registers lock0, lock1 and applying the following transformation:

Upon finishing the entry section, a thread checks if lock0=1 or lock1=1.
    If lock0=1 or lock1=1, the thread starts the entry section again.
    If lock0=0 and lock1=0, the thread sets lock0 and lock1 to 1, and enters the critical section.
Prior to starting the exit section, a thread sets lock0 and lock1 to 0.

Assuming that the existing code as specified in the entry section and exit section code achieves mutual-exclusion properties, deadlock freedom, and starvation avoidance, the fortified algorithm also achieves these properties. Moreover, it is strongly 0-susceptible, i.e., no corruption of a single shared variable in a heavy state will cause two threads to end up in the critical section at the same time. It is noted, of course, that the manner in which the locks are "set" can be chosen arbitrarily. That is, each "1" in the examples above and below could be replaced with a "0," and vice versa, as long as the scheme is consistent and understood.

FIG. 2, for instance, illustrates an example structure of a fault-resistant, mutual-exclusion algorithm, as applied to a particular thread. Here, the example thread includes a critical section 202 and a remainder 204. In addition, the mutual-exclusion algorithm defines an entry section 206 and an exit section 208. Further, due to the fortification of the algorithm, the algorithm also provides a decision block 210, as well as instructions 212 and 214.

Figure 3:
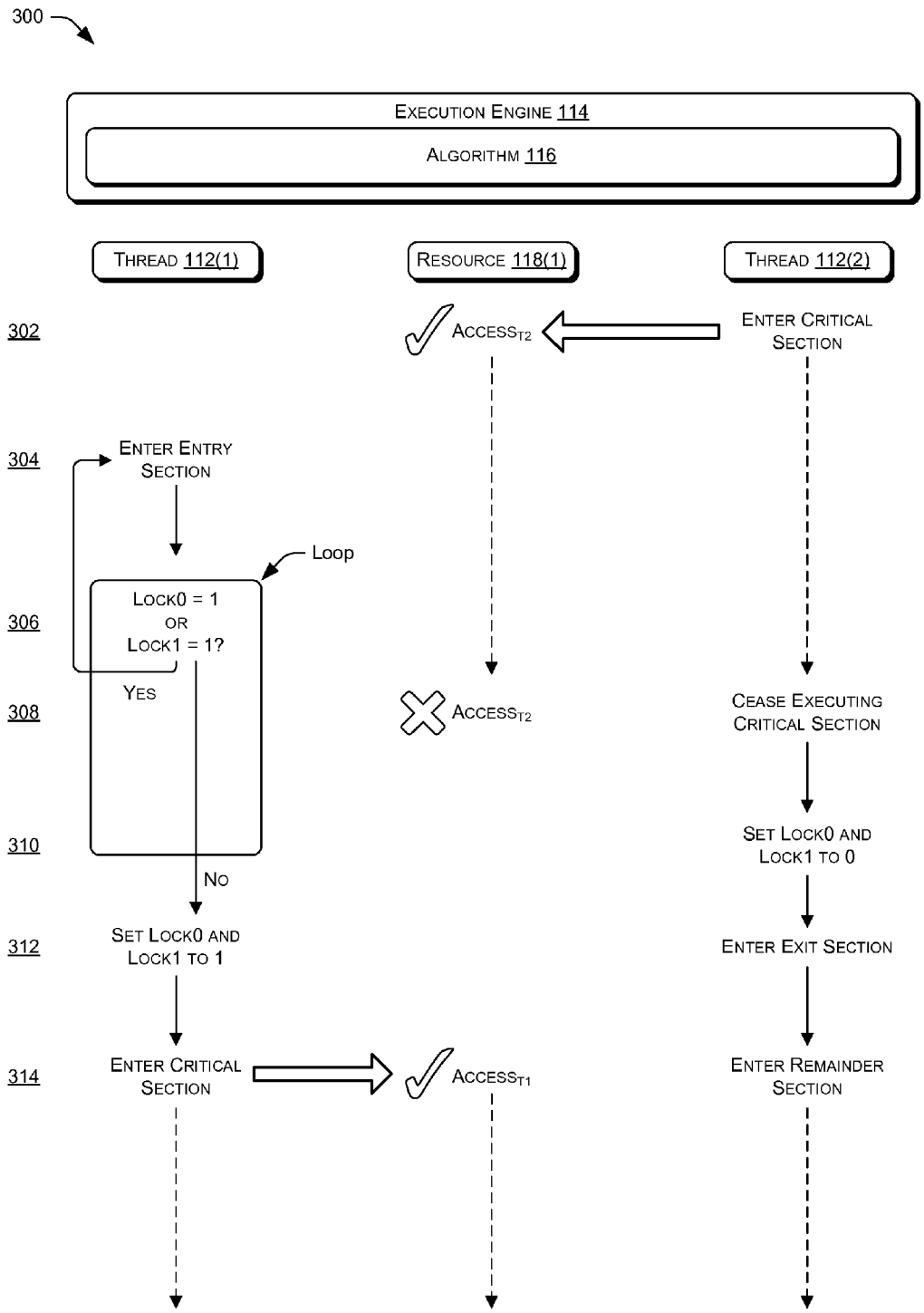
FIG. 3 is a flow diagram illustrating an example process of an execution engine executing two threads each seeking access to a shared resource. Here, the execution engine utilizes a fault-resistant, mutual-exclusion algorithm to help ensure that these threads do not simultaneously access the shared resource, even in the event that the underlying computing device experiences a transient memory fault or "soft error."

With reference to this structure, FIG. 3 is a flow diagram illustrating an example process 300 of an execution engine executing two threads 112(1) and 112(2), with each of these threads seeking access to a shared resource 118(1). In the process, the actions listed underneath the respective threads 112(1) and 112(2) represent those actions performed by the threads, as executed by the execution engine 114 implementing the fault-resistant algorithm 116.

At 302, the thread 112(2) is executing its critical section. As such, FIG. 3 indicates that the thread 112(2) is accessing the shared resource 118(1). This access continues while the thread 112(2) executes its critical section. At 304, meanwhile, the thread 112(1) begins executing its entry section in this example. At 306, the thread 112(1) determines whether either lock0 or lock1 has been set (e.g., has a value of 1). If either of these locks is set, then the thread 112(1) returns to 304 and again completes the entry section. The thread 112(1) loops between 304 and 306 until making a determination that both of lock0 and lock1 is not set (e.g., has a value of 0), as discussed below.

In this example, at 308, the thread 112(2) finishes execution of its critical section and, hence, ceases accessing the resource 118(1). In addition, the thread 112(2) clears both lock0 and lock1—that is, the thread 112(2) sets both of these locks to 0 at 310. At 312, the thread 112(2) enters it exit section, while the thread 112(1) makes a determination that both of the locks are no longer set. While FIG. 3 illustrates both of these acts as occurring at the same time, this is merely for clarity of illustration and the reader will appreciate that these events need not take place at the same time.

At 312, the thread 112(1) proceeds to set both lock0 and lock1 to a value of 1. At 314, the thread 112(1) enters its critical section and, hence, begins accessing the shared resource 118(1). With use of the additional locks, the process 300, therefore, provides for mutual exclusion, even in the event of a soft error. That is, if one of lock0 or lock1 (or one of the other shared variables used by the original algorithm) clears or is in any other way corrupted due to a soft error while either of the threads is in its respective critical section, the other lock will remain set and, hence, the other thread will not proceed to its critical section. While FIG. 3 illustrates an algorithm that is strongly 0-susceptible for one fault, these techniques may apply to any other number of m faults. In these instances, the algorithm may employ m+1 locks.

Fortifying Against Multiple Memory Errors

While FIG. 3 illustrates an algorithm that is strongly 0-susceptible for one fault, a similar transformation may be used to protect against multiple corrupted registers (i.e., multiple soft errors). When protecting against m soft errors, any existing mutual-exclusion algorithm can be fortified using m+1 additional shared registers lock0, ..., lock(m) and applying the same transformation as above, where each lock register is checked before entering the critical section. As with the process 300, each lock variable is set to 1 prior to a thread entering its critical section, and in the exit section each lock is reset to 0.

Fortified-Dekker Algorithm for Mutual Exclusion

The above procedure of fortification may be applied to any existing mutual-exclusion algorithm, as well as potentially to other mutual-exclusion algorithms developed in the future. However, this comes at the cost of two additional shared read-write variables (or m+1 in the case of up to m faults). For some well-known mutual-exclusion algorithms, less costly solutions are possible as detailed below.

For example, the Dekker algorithm can be turned into a strongly 0-susceptible algorithm using only one single additional shared variable, "lock." Below is the code of a 2-process mutual-exclusion algorithm based on Dekker's algorithm which is strongly 0-susceptible, and uses only one additional shared register.

```
shared registers c0,c1,turn,lock;
thread 0
c0 := 1;
while(c1 = 1 or lock = 1)
{
    if(turn = 1)
        c0 := 0;
    wait until turn = 0;
    c0 := 1;
}
lock := 1;
[critical section]
c0 := 0;
turn := 1
```

-continued

```
lock := 0;
thread 1
c1 := 1;
while(c0 = 1 or lock = 1)
{
    if(turn = 0)
        c1 := 0;
    wait until turn = 1;
    c1 := 1;
}
lock := 1;
[critical section]
c1 := 0;
turn := 0;
lock := 0;
```

In the original Dekker algorithm, the critical section is protected by the flag variables, c0 and c1. That is, neither thread can enter the critical section while the other thread's flag is set. However, if a memory fault causes a thread's flag to reset while it is in the critical section, then no evidence remains in memory to show that the thread is in the critical section. In this case, if the other thread begins the entry section, it will enter the critical section as well, violating mutual exclusion. In contrast, in the Fortified Dekker algorithm, the critical section is protected by two variables: the flag of the thread that is in the critical section, and the lock variable. If one variable is corrupted while a thread is critical, the other variable still remains set, preventing the other thread from entering the critical section.

The reason a single additional variable (e.g., lock) is sufficient is that in the Dekker algorithm the critical section is already protected by one variable, which is set by the thread when it enters the critical section. The same approach is applicable to any algorithm which has the following property:

For any process (i.e., thread) p, there is some shared variable $x_p$ such that whenever p enters the critical section it sets $x_p$ to 1, and whenever it exits the critical section it sets $x_p$ to 0; and No other process $q \neq p$ can enter the critical section while $x_p$ is set to 1.

In this case by adding one additional variable in the manner shown above, the techniques ensure that the evidence for the thread being in the critical section is not completely wiped from shared memory in the event of a soft error. Further, a similar transformation is possible to again protect against m faults. In this case (unlike in the above fortification case), only m new variables are utilized, rather than m+1.

Fault-Tolerant Dekker

The algorithm given above is strongly 0-susceptible, but it is not fault-tolerant because of the following scenario: first, thread 0 executes until it is just about to set lock to 1, and then the flag c0 flips to 0. Now thread 1 begins to execute, and because it observes c0=0, it eventually also gets past the if-statement, and is about to set lock to 1. Now thread 0 continues to run and enters the critical section. Then, thread 1 runs, and it also enters the critical section, leading to a violation of mutual exclusion.

To eliminate this scenario, the following fault-tolerant, mutual-exclusion algorithm may be employed:

```
shared registers c0,c1,turn,lock;
thread 0
c0 := 1;
while(c1 = 1 or lock = 1)
{
    if(turn = 1)
```

```
        c0 := 0;
        wait until turn = 0;
        c0 := 1;
    }
    lock := 1;
    if(c0 = 0)
        start over;
    [critical section]
    c0 := 0;
    turn := 1;
    lock := 0;
    thread 1
    c1 := 1;
    while(c0 = 1 or lock = 1)
    {
        if(turn = 0)
            c1 := 0;
        wait until turn = 1;
        c1 := 1;
    }
    lock := 1;
    if(c1 = 0)
        start over;
    [critical section]
    c1 := 0;
    turn := 0;
    Lock := 0
```

The only change between this algorithm and the previous algorithm is that now each thread checks, after it sets lock to 1, whether its flag (c0 or c1 respectively) has flipped to 0. If it has, then the thread does not enter the critical section, and instead it goes back to the beginning of the entry section and tries again.

This approach applies to the same class of algorithms as the approach demonstrated in the Fortified-Dekker algorithm, and may be used to protect an algorithm for up any number of "m" faults.

Test&Set-Based Algorithm for Mutual Exclusion

The fault-resistant, mutual-exclusion algorithms described above primarily envision variables implemented as read-write registers (i.e., the only available atomic operations to make on the variable are to read from it or to write to it). There are no stronger atomic operations allowed to these variables. In case stronger registers are available (e.g., as provided by the hardware of the system), fortification of any existing mutual exclusion algorithm can be achieved by adding one additional shared variable.

The following algorithm is a 2-variable, n-process mutual-exclusion algorithm that is resilient to one corrupted shared register. It satisfies no-deadlock, but not no-starvation. The algorithm uses the test&set instruction, which executes as follows: test&set(x) first examines the value of variable x, and if x=1, then the test&set instruction returns 0 and does not change the value of x. In contrast, if x=0, then the test&set instruction sets x to 1 and returns 1. Note that a test&set instruction is executed atomically, that is, no other thread can take steps while a thread is executing a test&set instruction.

```
    shared registers x,lock;
    thread i
    wait until lock = 0;
    if(test&set(x) = 0)
        start over;
    if(test&set(lock) = 0)
        start over;
    [critical section]
    lock := 0;
    x := 0;
```

As in the fault-tolerant Dekker case, the algorithm achieves resilience at the cost of a single additional variable (here, a lock). This single additional variable suffices for the same reason as for fault-tolerant Dekker: the critical section is already protected by one variable (x), and adding one variable is sufficient to guarantee that both variables are not corrupted at the same time.

Resilient Mutual Exclusion without Additional Shared Memory

Each of the above fault-resistant algorithms utilizes extra shared memory. This sub-section, meanwhile, describes fault-resilient, mutual-exclusion algorithms that do not require additional shared memory. That is, these mutual-exclusion algorithms achieve fault-resistance without using more shared variables than existing mutual-exclusion algorithms, such as Dekker or Peterson.

Specifically, each algorithm of the following class of mutual-exclusion algorithms is resilient to corruption of m shared memory registers. Algorithms in the class may satisfy the Hamming-Distance-(m+1) property described below. Additionally or alternatively, these algorithms may employ a handshake that passes control of the critical section from one thread to another, also as described below.

First, algorithms may satisfy the Hamming-Distance-(m+1) property if they satisfy the following properties:

Let v equal the state of the shared memory when each thread is in the remainder, and let v' equal the state of the shared memory when at least one thread is in the critical section and at least one other thread is in the remainder. Then, a mutual-exclusion algorithm is a Hamming-Distance-(m+1) algorithm if the Hamming distance between v and v' is at least m+1 bits.

Each of the algorithms defined below satisfies the Hamming-distance-(m+1) property. The goal of a Hamming-distance-(m+1) algorithm is to ensure that if m bits flip (or are otherwise corrupted) in a state where some thread is critical, there will still be evidence in shared memory of the fact that the thread is critical; if such evidence were not present, other threads may enter the critical section, violating mutual exclusion.

For example, it can be proven that any mutual-exclusion algorithm for two processors that is fault-tolerant, strongly 0-susceptible, or even weakly 0-susceptible to a single memory error must be a Hamming-distance-2, mutual-exclusion algorithm. In other words, being a Hamming-distance-2 algorithm is a necessary condition for achieving any of these resilience properties.

As discussed, above, fault-resistant, mutual-exclusion algorithms may also utilize a handshake to pass control of the critical section between threads. In some instances, such algorithms may be entitled "handshake-protected-region algorithms," with the "protected region" including any global state of the system in which:

Some thread i is in the entry section, after its first write operation in that section;

Some other thread j is either in the critical section or in the entry section after its first write operation in that section; and The state of the shared memory differs in at most one variable from the state of the memory when thread j is in the critical section.

In some instances, an algorithm is a handshake-protected-region algorithm if, from any state in the protected region, no thread can enter the critical section without executing a special code segment called a handshake. In one example, the handshake comprises a sequence of changes to shared memory with the following properties:

At the beginning of the handshake, thread i is critical and thread j is in the entry section.

At the end of the handshake, the state of the shared memory is the same state obtained when thread j runs alone from the idle configuration until it enters the critical section.

Thread i makes the first and the last changes to shared memory in the sequence.

During the handshake, thread i changes the values of at least m+1 shared registers, such that after changing register x, thread i does not write to x again until thread j writes to shared memory.

After the handshake, thread i is free to leave the exit section, and thread j is free to enter the critical section.

The goal of the protected region is to ensure that if m bits flip in a state where thread i is critical and thread j is in the entry section, it is still not possible for thread j to enter the critical section before thread i exits it, as that would violate mutual exclusion. The handshake achieves this property, and involves m+1 registers changing value; even if m registers are corrupted, a successful handshake cannot occur without thread i's active participation. Hence, thread j cannot "believe" that a handshake occurred as long as thread i remains in the critical section.

In some instances, a fault-resilient, mutual-exclusion algorithm that does not require additional shared variables is both a Hamming-Distance-(m+1) algorithm as well as a handshake-protected-region algorithm. The combination of these two concepts allows achieving significant resilience to soft errors. The following algorithms illustrate three example instantiations of algorithms that satisfy both the Hamming-Distance-(m+1) property as well as the handshake-protected-region property. These algorithms may achieve varying degree of resilience.

Weakly 0-Susceptible Mutual-Exclusion Algorithm:

The following algorithm achieves weak 0-susceptibility among two processors. The algorithm can also be a building block for any general m-process, mutual-exclusion algorithm using standard techniques. The following algorithm, however, in its 2-process form for simplicity and clarity of exposition.

```
shared c0, c1, lock;
thread p0:
    c0 := 1;
loop0:
    wait: lock = 0;
    if(c1 = 1)
    {
        wait: c0 = 0 || c1 = 0;
        if(c0 = 0)
            goto finish_handshake;
        else
            goto loop0;
    }
    lock := 1;
    if(c1 = 1)
    {
        lock := 0;
        wait: c0 = 0;
finish_handshake:
        c0 := 1;
        wait: c1 = 0;
        [critical section]
        c0 := 0;
        c1 := 1;
    }
    else
    {
        c0 := 1;
        if(c1 = 1)
        {
```

-continued

```
            lock := 0;
            goto loop0;
        }
        [critical section]
        c0 := 0;
        lock := 0;
    }
}
thread p1:
    c1 := 1;
    wait: lock = 0;
    c1 := 1;
loop1:
    if(c0 = 1)
    {
        c0 := 0;
        wait: c0 = 1;
        c1 := 0;
        wait: c1 = 1;
    }
    lock := 1;
    [critical section]
    lock := 0;
    c1 := 0;
}
```

It can be proven that the algorithm above is weakly 0-susceptible. However, this algorithm is neither strongly 0-susceptible, nor fault-tolerant. This algorithm satisfies both the Hamming-Distance-2 property as well as handshake-protected-region property as follows.

Hamming-Distance-2 property: In the above algorithm, when each executing process is in the remainder, the value of each shared variable is 0. In contrast, when thread 0 is in the critical section, both c0 and lock are set to 1, and when thread 1 is in the critical section both c1 and lock are set to 1. Therefore, the algorithm satisfies the Hamming-Distance-2 property.

Handshake-protected-region property: It can be shown that in the above algorithms, each line between label loop0 and label finish_handshake in thread 0's code, and the line immediately following loop1 in thread 1's code form a protected region. If the threads are in these respective parts of their code, then neither can enter the critical section until a handshake is executed. The handshake code is the code starting from label finish_handshake in thread 0's code and starting immediately after the if-statement in thread 1's code. Notice that during the handshake, thread 1 modifies the values of two variables (c0 and c1).

Strongly 0-Susceptible Mutual-Exclusion Algorithm:

The following algorithm achieves strong 0-susceptibility among two processors. The algorithm can also be a building block for any general m-process Mutual-exclusion algorithm using standard techniques. We state the algorithm in its 2-process form for simplicity and clarity of exposition.

```
shared c0, c1, lock;
thread p0
    c0 := 1;
loop0:
    wait: lock = 0;
    if(c1 = 1)
    {
        wait: c0 = 0 || c1 = 0;
        if(c0 = 0)
            goto finish_handshake;
        else
            goto loop0;
    }
    lock := 1;
```

```
            if(c1 = 1)
            {
                lock := 0;
                wait: c0 = 0;
        finish_handshake:
                c0 := 1;
                wait: c1 = 0;
                [critical section]
                c0 := 0;
                c1 := 1;
                lock := 1;
            }
            else
            {
                c0 := 1;
                if(c1 = 1)
                {
                    lock := 0;
                    goto loop0;
                }
                [critical section]
                c0 := 0;
                lock := 0;
            }
        thread p1
            c1 := 1;
            wait: lock = 0;
            c1 := 1;
        loop1:
            if(c0 = 1)
            {
                c0 := 0;
                wait: c0 = 1;
                c1 := 0;
                wait: c1 = 1;
                wait: lock = 1;
            }
            lock := 1;
            [critical section]
            lock := 0;
            c1 := 0;
```

This algorithm is similar to the weakly 0-susceptible algorithm above, and it satisfies the Hamming-Distance-2 and the handshake-protected-region properties for the same reasons.

A difference between this algorithm and the weakly 0-susceptible algorithm, however, is that in the strongly 0-susceptible algorithm a secondary handshake exists. Specifically, if thread 0 enters the critical section after a handshake, then when it exits, it changes two shared variables that it cannot immediately change again (c1 and lock; notice that c0 is also modified, but if thread 0 begins the entry section again, it can immediately set c0 back to 1, and so thread 1 cannot necessarily observe this change). This ensures that if one variable is corrupted while thread 0 is in the critical section after executing a handshake, then thread 1 will not enter the critical section as well, because thread 1 waits to see the values of both c1 and lock change.

Note that the state in which thread 0 is in the critical section after a handshake, and thread 1 is in the entry section waiting, is not a heavy state under the weak susceptibility definition. However, it is a heavy state under the strong susceptibility definition, and so the algorithm above protects against the possibility of a single bit flip in this state.

Fault-Tolerant Mutual-Exclusion Algorithm

The following algorithm achieves fault-tolerance among two processors. The algorithm can also be a building block for any general m-process, mutual-exclusion algorithm using standard techniques. The algorithm below is in its 2-process form for simplicity and clarity of exposition.

```
        shared c0, c1, lock;
        thread p0
            c0 := 1;
        loop0:
            wait: lock = 0;
            if(c1 = 1)
            {
                wait: c0 = 0 || c1 = 0;
                if(c0 = 0)
                    goto f_hs;
                else
                    goto loop0;
            }
            lock := 1;
            if(c1 = 1)
            {
                lock := 0;
                wait: c0 = 0;
        finish_handskake:
                c0 := 1;
                wait: c1 = 0;
                [critical section]
                c0 := 0;
                c1 := 1;
                lock := 1;
            }
            else
            {
                c0 := 1;
                if(c1 = 1)
                {
                    lock := 0;
                    goto loop0;
                }
                [critical section]
                c0 := 0;
                lock := 0;
            }
        thread p1
        start1:
            c1 := 1;
            wait: lock = 0;
            c1 := 1;
        loop1:
            if(c0 = 1)
            {
                goto p1hs;
            }
            else
            {
                lock := 1;
(*)             if(c0 = 1)
                {
                    lock := 0;
                    goto p1hs;
                }
                if(c1 = 0)
                {
                    goto start1;
                }
                if(c0 = 1)
                {
                    lock := 0;
                    goto p1hs;
(**)            }
            }
                goto p1crit;
        p1hs:
            c0 := 0;
            wait: c0 = 1;
            c1 := 0;
            wait: c1 = 1;
            wait: lock = 1;
        p1crit:
            [critical section]
            lock := 0;
            c1 := 0;
```

This algorithm also follows the structure of the weakly 0-susceptible and strongly 0-susceptible algorithms above. It has the same protected region, with the addition of the lines of code between (*) and (**). The algorithm satisfies the Hamming-Distance-2 and the handshake-protected-region properties for the same reasons as the weakly and strongly 0-susceptible algorithms.

One difference from the strongly 0-susceptible algorithm is in thread 1's code: in the fault-tolerant algorithm, if thread 1 begins the entry section and observes that c0=0, it cannot immediately set the lock and enter the critical section, as it would do in the weakly and strongly 0-susceptible algorithms above. This is because of the possibility of the following sequence of events (which can occur in the weakly and strongly 0-susceptible algorithms):

Thread 1 begins executing the entry section while thread 0 is in the remainder. It runs until it is just about to set lock, but is stopped before it writes to lock.

The flag c1 flips to 0.

Thread 0 starts its entry section. It runs until it enters the critical section (which it will do, because it observes c0=0 and lock=0).

Thread 1 continues running from the point it stopped previously. It sets lock to 1 and enters the critical section, violating mutual exclusion.

Note that the state in which c1 flips above is not a heavy state according to the weak or strong 0-susceptibility definitions, and so we do not need to prevent the scenario above to guarantee strong or weak 0-susceptibility. However, to guarantee worst-case fault-tolerance this scenario may be prevented in some instances.

In order to eliminate this error scenario we add the code lines between lines (*) and (**) in thread 1's code. In this code segment, after thread 1 has set the lock, it checks whether thread 0 has come in and set its flag (c0) to 1. If this occurred, then thread 1 releases the lock, and goes to execute the handshake with thread 0. Next, thread 1 checks to see if its own flag has flipped and, if this occurred, it starts the whole entry section over. Finally, because c1 could flip to 0 immediately after thread 1 checks that it has not flipped, thread 1 checks again whether thread 0 has set its flag (c0), and if not, thread 1 enters the critical section. This guarantees that if thread 0 does begin the entry section, it must begin after thread 1 set both c1 and lock, so thread 0 will not enter the critical section.

m-Thread Resilient Mutual-Exclusion Algorithms

The algorithms above are designed to provide mutual exclusion for two threads, but they can be transformed into m-thread mutual-exclusion algorithms. For instance, the execution engine 114 described above may enable multiple threads to compete for access to their respective critical sections and, hence, to the shared resource.

Figure 4:
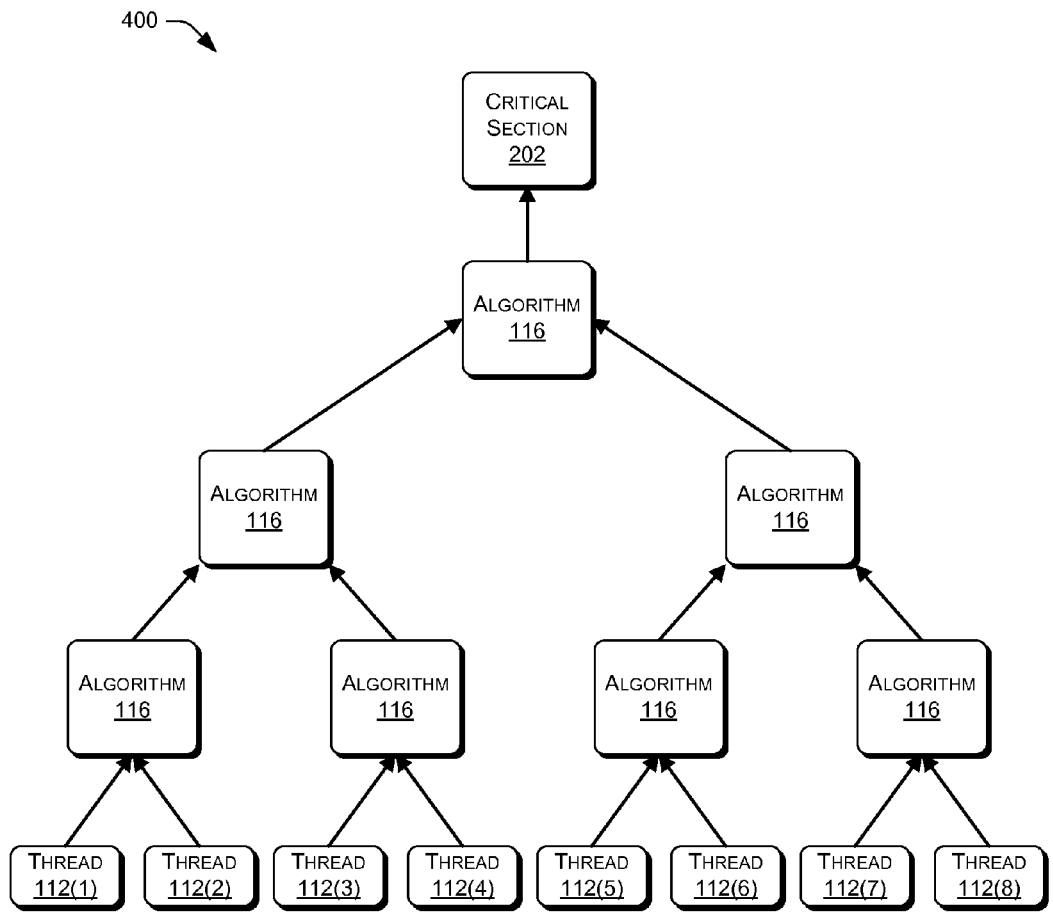
FIG. 4 illustrates an example tournament tree approach that the systems described herein may implement when more than two threads each seek to execute their critical section, with each critical section accessing a shared resource.

FIG. 4, for instance, illustrates an example tournament tree approach that the systems described herein may implement when more than two threads each seek to execute their critical section. Here, the techniques construct a binary tree 400 of 2-thread mutual-exclusion objects, as illustrated. At the bottom of the binary tree 400, each of threads 112(1)-(8) seek authority to execute their critical section. Therefore, each of these threads participates in a series of 2-thread mutual-exclusion algorithms 116, starting from the leaves of the tree and making its way up to the root. Each thread only proceeds up the tree once the 2-thread mutual-exclusion algorithm in its current node has allowed it entry. Once the thread finishes the 2-thread Mutual-exclusion at the root of the tree, it enters the critical section.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
one or more memories;
a first thread, stored in the one or more memories and executable on the one or more processors, the first thread including a critical section of the first thread;
a second thread, stored in the one or more memories and executable on the one or more processors, the second thread including a critical section of the second thread; and
an execution engine, stored in the one or more memories and configured to cause execution of the first and second threads on the one or more processors using a mutual-exclusion algorithm that resists m faults, and at least prevents simultaneous execution of the critical section of the first thread and the critical section of the second thread by satisfying a hamming-distance-(m+1) property after the system experiences a soft error and when (i) one thread of the first and second threads is in a critical section, (ii) and another thread of the first and second threads is waiting in a loop to enter its critical section, wherein the soft error is a temporary hardware failure that alters a processor component, wherein m is an integer and not less than 1.

2. A system as recited in claim 1, wherein the execution engine further prevents, with use of the mutual-exclusion algorithm, simultaneous execution of the critical section of the first thread and the critical section of the second thread after the system experiences the soft error when there is contention between the first and second threads.

3. A system as recited in claim 1, wherein the mutual-exclusion algorithm is fault-tolerant to prevent the simultaneous execution of the critical section of the first thread and the critical section of the second thread regardless of when the system experiences the soft error.

4. A system as recited in claim 1, wherein each of the critical sections accesses a common resource when executed, and wherein the mutual-exclusion algorithm prevents simultaneous access to the common resource.

5. A system as recited in claim 1, wherein:
the mutual-exclusion algorithm defines an entry section of code for the first and second threads to execute prior to execution of their respective critical sections; and
the resisting the m faults comprises resist the m faults by:
when the first or second thread completes the entry section, instructing the first or second thread to determine whether each of m+1 shared variables has been set;
instructing the first or second thread to again execute the entry section when the first or second thread determines that at least one of the m+1 shared variables has been set; and
instructing the first or second thread to execute the respective critical section when the first or second thread determines that each of the m+1 shared variables has not been set.

6. A system as recited in claim 5, wherein the mutual-exclusion algorithm is further configured to resist m faults by:
instructing the first or second thread to set each of the m+1 shared variables after the first or second thread completes its execution of the entry section and determines that each of the m+1 shared variables have not been set.

7. A system as recited in claim 5, wherein the mutual-exclusion algorithm defines an exit section of code for the first and second threads to execute after execution of their respective critical sections, and wherein the mutual-exclusion algorithm is further configured to resist m faults by:
instructing the first or second thread to clear each of the m+1 shared variables after executing the respective critical section and prior to starting the respective exit section.

8. A system as recited in claim 1, wherein a selected subset of steps of the mutual-exclusion algorithm comprise Dekker's algorithm or Peterson's algorithm.

9. A system as recited in claim 1, wherein:
the one or more memories further store third and fourth threads having respective critical sections of code executable on the one or more processors; and
the execution engine is further configured to enable the first, second, third, and fourth threads to compete with one another to enter the respective critical section.

10. A system as recited in claim 1, wherein the first thread and the second thread are executable on a same one or different ones of the one or more processors, and the first thread and the second thread are stored in a same one or different ones of the one or more memories.

11. A system comprising:
one or more processors;
one or more memories;
an execution engine, stored in the one or more memories and configured to cause execution of first and second threads on the one or more processors using a mutual-exclusion algorithm that substantially prevents simultaneous access to a common resource by the first and second threads after the system experiences m soft errors, the mutual-exclusion algorithm substantially preventing the simultaneous access of the resource at least by satisfying the hamming-distance-(m+1) property, wherein m is an integer and not less than 1.

12. A system as recited in claim 11, wherein the first and second threads each include a respective critical section of code that accesses the resource and a remainder section of code that executes after the critical section, and wherein the mutual-exclusion algorithm satisfies the hamming-distance-(m+1) property by having a hamming distance of m+1 bits between v and v', wherein:
v represents a state of memory shared between the first and second threads when the first and second threads are in the respective remainder sections; and
v' represents the state of the memory shared between the first and second threads when one of the first and the second threads is in its respective critical section and the other of the first and second threads is in its respective remainder section.

13. A system as recited in claim 11, wherein the first and second threads each include a respective critical section of code that accesses the resource, and wherein the mutual-exclusion algorithm also substantially prevents the simultaneous access of the resource by instructing the first and second threads to engage in a handshake that, when completed, enables the first thread or the second thread to enter its respective critical section.

14. A system as recited in claim 13, wherein the mutual-exclusion algorithm defines an entry section of code for the first and second threads to execute prior to execution of their respective critical sections, and wherein the mutual-exclusion algorithm instructs the first and second threads to engage in the handshake based at least in part on: (i) one of the first and second threads being in the entry section; and (ii) the other of the first and second threads being in the entry section or its critical section.

15. A system as recited in claim 11, wherein the mutual-exclusion algorithm comprises a fault-tolerant, mutual-exclusion algorithm that prevents the simultaneous access of the resource by the first and second threads after the system experiences the m soft errors and regardless of when the system experiences the m soft errors.

16. A system as recited in claim 11, wherein:
the first and second threads each include a respective critical section of code that accesses the resource;
the resource is further accessible to respective critical sections of code of third and fourth threads stored in the one or more memories and executing on the one or more processors; and
the execution engine is further configured to enable the first, second, third, and fourth threads to compete with one another to enter the respective critical section.

17. A system comprising:
one or more processors;
one or more memories;
a resource, stored in the one or more memories and accessible to first and second threads stored in the one or more memories and executing on the one or more processors, the first and second threads each including a respective critical section of code that accesses the resource; and
an execution engine, stored in the one or more memories and configured to cause execution of the first and second threads on the one or more processors using a mutual-exclusion algorithm, wherein the mutual-exclusion algorithm:
prevents simultaneous access of the resource by the first and second threads after the system experiences m soft errors when (i) one thread of the first and second threads is in its critical section, (ii) and another thread of the first and second threads is waiting in a loop to enter its critical section;
satisfies the hamming-distance-(m+1) property; and
instructs the first and the second threads to engage in a handshake that, when completed, enables the first thread or the second thread to switch the respective critical section from one thread to another, wherein m is an integer and not less than 1.

18. A system as recited in claim 17, wherein the mutual-exclusion algorithm is also fault-tolerant to prevent the simultaneous access of the resource by the first and second threads regardless of when the system experiences them soft errors.

19. A system as recited in claim 17, wherein the mutual-exclusion algorithm prevents the simultaneous access of the resource by the first and second threads after the system experiences the m soft errors with reference to at least m variables stored in the one or more memories and shared between the first and second threads.

20. A system as recited in claim 17, wherein the first and second threads each include a remainder section of code that executes after the respective critical section, and wherein the mutual-exclusion algorithm satisfies the hamming-distance-(m+1) property by having a hamming distance of m+1 bits between v and v', wherein:
v represents a state of memory shared between the first and second threads when the first and second threads are in the respective remainder sections; and
v' represents the state of the memory shared between the first and second threads when one of the first and the second threads is in its respective critical section and the other of first and second threads is in its respective remainder section.

* * * * *